United States Patent [19]
Glander et al.

[11] 3,854,002
[45] Dec. 10, 1974

[54] EXTENSIBLE HELICALLY COILED ELECTRICAL LEADS

[75] Inventors: Fritz O. Glander, Isernhagen; Horst Rager, Nurnberg; Bernd Eilhardt, Vinnhorst, all of Germany

[73] Assignee: Kabel-und Metallwerke Gutehoffnungshutte Aktiengesellschaft, Hanover, Germany

[22] Filed: Dec. 21, 1970

[21] Appl. No.: 99,742

[30] Foreign Application Priority Data
Dec. 23, 1969 Germany.......................... 1964339

[52] U.S. Cl. ............................. 174/69, 174/137 B
[51] Int. Cl. ........................................... H01b 7/06
[58] Field of Search ............ 174/69, 137 B, 110 SR; 161/190; 191/12

[56] References Cited
UNITED STATES PATENTS
3,334,176  8/1967  Liszczak ............................ 174/69

FOREIGN PATENTS OR APPLICATIONS
1,083,932  9/1967  Great Britain ...................... 174/69

OTHER PUBLICATIONS d'Adolf, "Urethane Rubbers Growing in Use," pub. Rubber World, Vol. 144, No. 4, July 1961 (TS1870.544) pp. 67-71.

Primary Examiner—Darrell L. Clay
Attorney, Agent, or Firm—Philip G. Hilbert

[57]  ABSTRACT

An extensible, helically coiled electrical lead including one or more electrical conductors, with an elastomeric covering of polyurethane alone or mixed with polyvinyl chloride; the covering being applied directly to the conductor as insulation therefor, as well as providing the resiliency required in extensible leads; or as a sheath for conductors insulated with thermoplastic resins.

1 Claim, 4 Drawing Figures

PATENTED DEC 10 1974
3,854,002

INVENTORS
Fritz Glander
Horst Rager
Bernd Eilhardt
BY Philip G. Hilbert
ATTORNEY

EXTENSIBLE HELICALLY COILED ELECTRICAL LEADS

BACKGROUND OF THE INVENTION

Helically coiled, extensible electrical leads are known and commonly used in telephone and portable electrical device applications. Such leads, as known, may comprise at least two stranded wires enclosed by a sheath formed of braided textile filaments or yarns. Further, the braiding may include prestressed rubber filaments, as shown in German Pat. No. 899,961. This type of lead presents several disadvantages, including slow rate of production due to the braiding operation; and a tendency toward fouling because of the textile mesh surface. Also, the fabric covering has a low resistance to abrasion and tends to absorb moisture.

Also, extensible leads are made by enclosing the lead conductors in a sheath of natural or synthetic rubber which is incompletely vulcanized at the time of application to the conductors, and whose vulcanization is completed later, see German Pat. No. 1,013,342. Aside from the fact, that in this form extensible lead, one can not use wire insulation of thermoplastic resin, the restoring forces available after extension of the lead, are quite limited. This is particularly evident in the case of large wire cross sections, such as those found in electrically operated machine tools of all kinds which have high current requirements.

This also applies to the use of sheathings formed of soft polyplastics such as plasticized polyvinyl chloride and the like. Such conductors are also, not suitable for larger wire cross sections and heavy current loads.

Accordingly, an object of this invention is to provide extensible, helically coiled electrical leads having one or more electrical conductors, with a covering of elastomeric material which may be applied as insulation for the conductors or as a sheath for preinsulated conductors; in either case, the elastomeric material exhibiting very high restoring forces when the lead is extended.

Another object of this invention is to provide an extensible electrical lead of the character described, which does not require supplemental inserts; is resistant to moisture penetration; show a high shear strength and resistance to the effects of repeated flexing; and can be applied to conductors of large cross section and current load capacity, while still retaining good restoration properties for the coiled lead.

Still another object of this invention is to provide an extensible electrical lead of the character described, wherein a covering constituted of polyurethane alone or admixed with polyvinyl chloride may be used as insulation for the conductor or as a sheath for enclosing the insulated conductors; the polyvinyl chloride enhancing the mechanical properties of the lead.

Yet another object of this invention is to provide an improved method of forming extensible electrical leads, wherein polyurethane is used as a covering for the lead conductor or conductors and which is applied by extrusion or the like at room temperature; the covered conductor being wound on a spindle and annealed for a short time interval at about 80° C.

Other objects of this invention will in part be obvious and in part hereinafter pointed out.

DESCRIPTION OF THE PREFERRED EMBODIMENTS

In accordance with the instant invention, one or more electrical conductors of varying cross sectional dimension, is enclosed in an elestomeric material; more particularly polyurethane, whereby there is produced an electrical lead in coiled helical form which is extensible and retractile.

Figure 1:
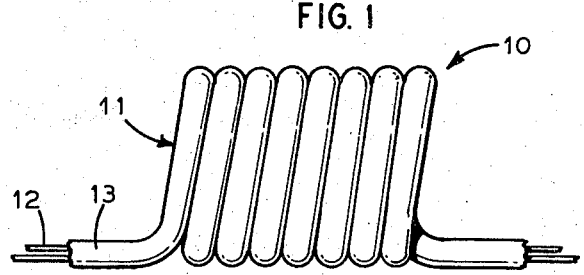
FIG. 1 is a side elevational view showing a coiled, extensible electrical lead embodying the instant invention.
Figure 2:
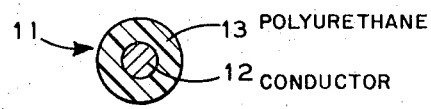
FIG. 2 is a transverse sectional view showing one embodiment of the invention.

Thus, as shown in FIG. 1, 10 designates a helically coiled electrical lead made up of successive convolutions 11 which comprise a copper conductor or conductors 12 and a covering 13 for said conductor or conductors 12. The covering 13 is an elastomeric material, more particularly polyurethane derived in a known manner from a polyester, polyether or caprolactam base.

Figure 3:
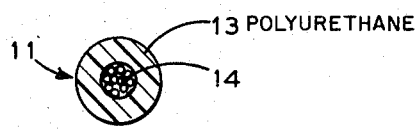
FIG. 3 is a transverse sectional view showing another embodiment of the invention.

As shown in FIG. 3, the covering 13 of polyurethane is applied to a plurality of stranded conductors 14. In both cases, the thickness of the covering 13 is proportioned to the cross sectional area of conductors 12, 14; whereby to provide maximum extensibility and ready retraction. Thus, the covering 13 constitutes the insulation for the conductors as well as the means for providing extensibility and retraction.

Figure 4:
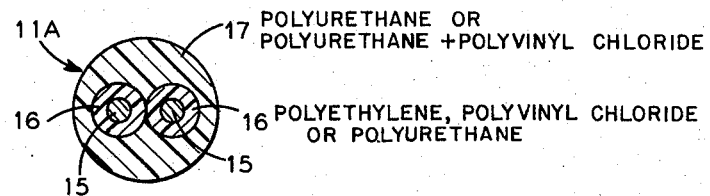
FIG. 4 is a transverse sectional view showing still another embodiment of the invention.

Alternatively, as shown in FIG. 4, individual conductors 15 are preinsulated by coverings 16 of polyethylene, polyvinyl chloride, or polyurethane. The insulated conductors are then enclosed in a sheath 17 to provide convolutions 11A. The sheath 17 is formed of polyurethane alone or in admixture with polyvinyl chloride. Preferably 70 parts of polyurethane are mixed with 30 parts of polyvinyl chloride, all by weight. Such mixture of polyurethane and polyvinyl chloride exhibits an elongation up to 50%. Thus, a lead having a covering of the indicated mixture will show good extensibility and ready retraction.

It has been found that leads made in accordance with the instant invention may extend over a wide range of conductor cross sections including telephone leads and leads for heavy duty portable or movable electrical equipment which comprise conductors of large current carrying capacity, are highly resilient with excellent retractile properties.

In making leads 10, where the covering 13 provides insulation for conductors 12, the polyurethane is extruded directly on the conductor and the thus covered conductor is wound on a mandrel and annealed or set at a temperature of about 80° C for from 1 to 2 minutes. The lead is then wound off the mandrel and is ready for use.

In making larger conductor leads, the annealed lead, made as described above, is again wound on a mandrel but in the opposite direction. It is understood that the wall thickness of the polyurethane or polyurethane-polyvinyl chloride coverings are proportioned to the cross sectional area of the conductors.

The mechanical strength of the covering is increased when polyvinyl chloride is added to the polyurethane.

Thus, polyurethane alone shows a tear strength of 50–60 kp/cm, while a mixture of polyurethane and polyvinyl chloride shows a tear strength of 150 kp/cm. The polyurethane in such mixtures preferably is present in a major proportion. One such polyurethane is known under the trade designation TN 65CH 85 AK.

We claim:

1. An extensible, helically coiled electrical lead comprising at least one conductor of large cross section and heavy current carrying capacity and an elastomeric covering for said conductor whereby the convolutions of said helically coiled lead are restored to their normal condition after extension of said lead, said elastomeric covering compising polyurethane and a minor proportion by weight of polyvinyl chloride.

* * * * *